United States Patent [19]
Johnson

[11] Patent Number: 5,797,660
[45] Date of Patent: Aug. 25, 1998

[54] AUTOMOTIVE WIRE SPOKE WHEELS

[76] Inventor: Donald A. Johnson, 4015 Pfeiffer Ct., Midland, Mich. 48640

[21] Appl. No.: 699,422

[22] Filed: Aug. 19, 1996

[51] Int. Cl.[6] .................................................. B60B 1/06
[52] U.S. Cl. ............................ 301/73; 301/55; 301/104
[58] Field of Search ................................. 301/73, 74, 79, 301/80, 104, 105.1, 54, 58, 57, 55, 56; D12/205, 204, 207, 208, 206, 209

[56] References Cited

U.S. PATENT DOCUMENTS

| | | |
|---|---|---|
| 30,915 | 12/1860 | Fisher . |
| 156,773 | 11/1874 | Cook ................................ 301/73 |
| D. 243,003 | 1/1977 | Reppert ............................ D12/205 |
| D. 257,615 | 12/1980 | Horikoshi . |
| D. 274,236 | 6/1984 | Woodward . |
| D. 312,998 | 12/1990 | Carlson . |
| D. 368,885 | 4/1996 | Wagner . |
| 633,282 | 9/1899 | Clay ................................. 301/73 |
| 1,910,164 | 5/1933 | Horn ................................ 301/54 |
| 2,056,554 | 10/1936 | Anderson ......................... 301/59 |
| 2,145,377 | 1/1939 | Sinclair ........................... 301/54 |
| 2,660,213 | 11/1953 | Gilbert ............................ 301/55 |
| 4,793,659 | 12/1988 | Oleff et al. ...................... 301/54 |

OTHER PUBLICATIONS

Truckin' Feb., 1996 vol. 22, No. 2.

*Primary Examiner*—David M. Mitchell
*Attorney, Agent, or Firm*—Reising, Ethington, Learman & McCulloch, PLLC

[57] ABSTRACT

A vehicle wheel has an annular rim, a hub, and a plurality of wire spokes coupling the rim and the hub. The rim has an axially extending web provided with tire locating beads. In some embodiments those ends of the spokes joined to the rim extend through the web whereas in other embodiments the rim is provided with a flange radially inward of the web to which the spokes are joined. The rim has circumferentially spaced scalloped or sculptured zones the surfaces of which are inclined relative to the axis of the rim, thereby enabling the spokes to be coupled to the rim at axially spaced points and distribute the forces acting between the spokes and the rim over a relatively greater area axially of the rim.

33 Claims, 6 Drawing Sheets

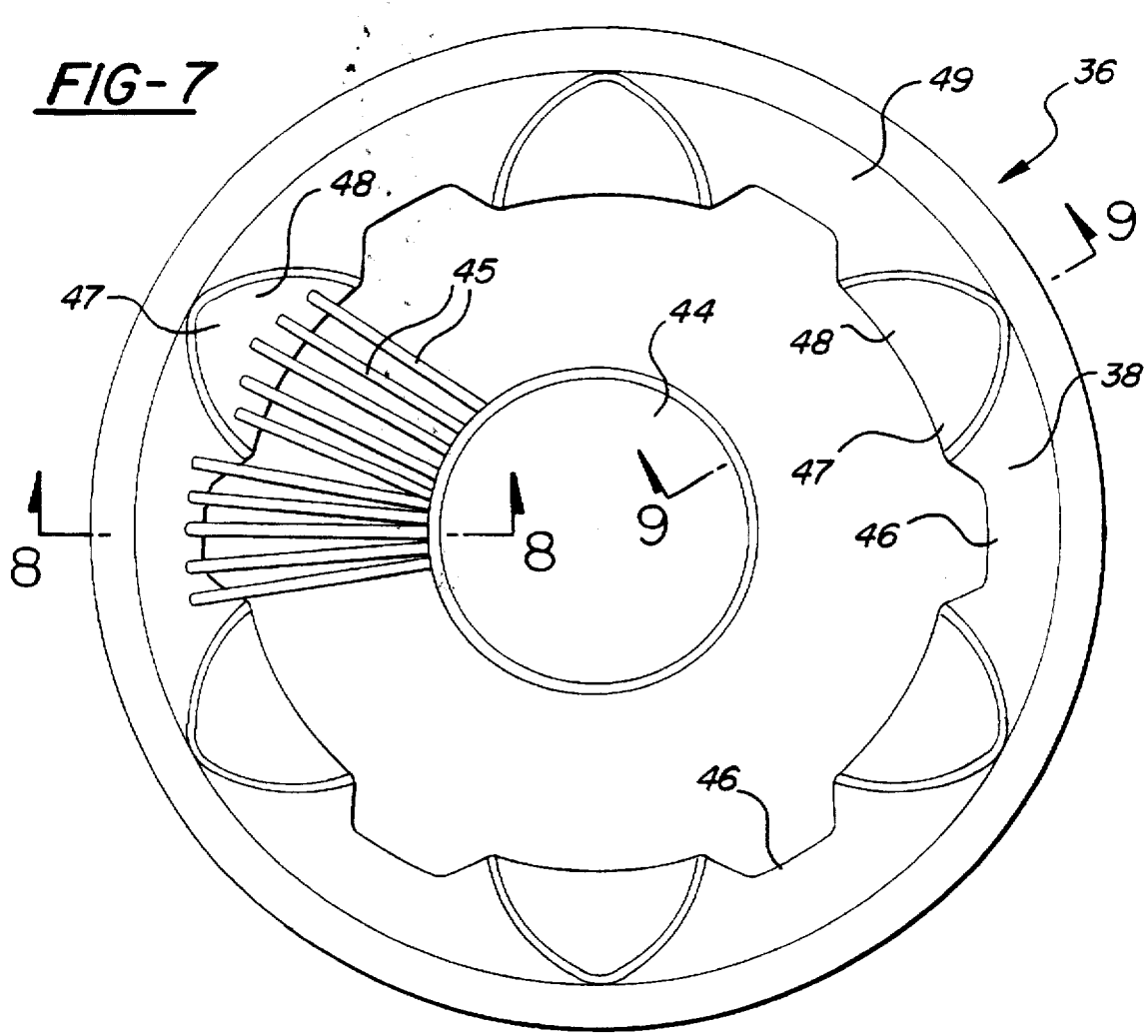

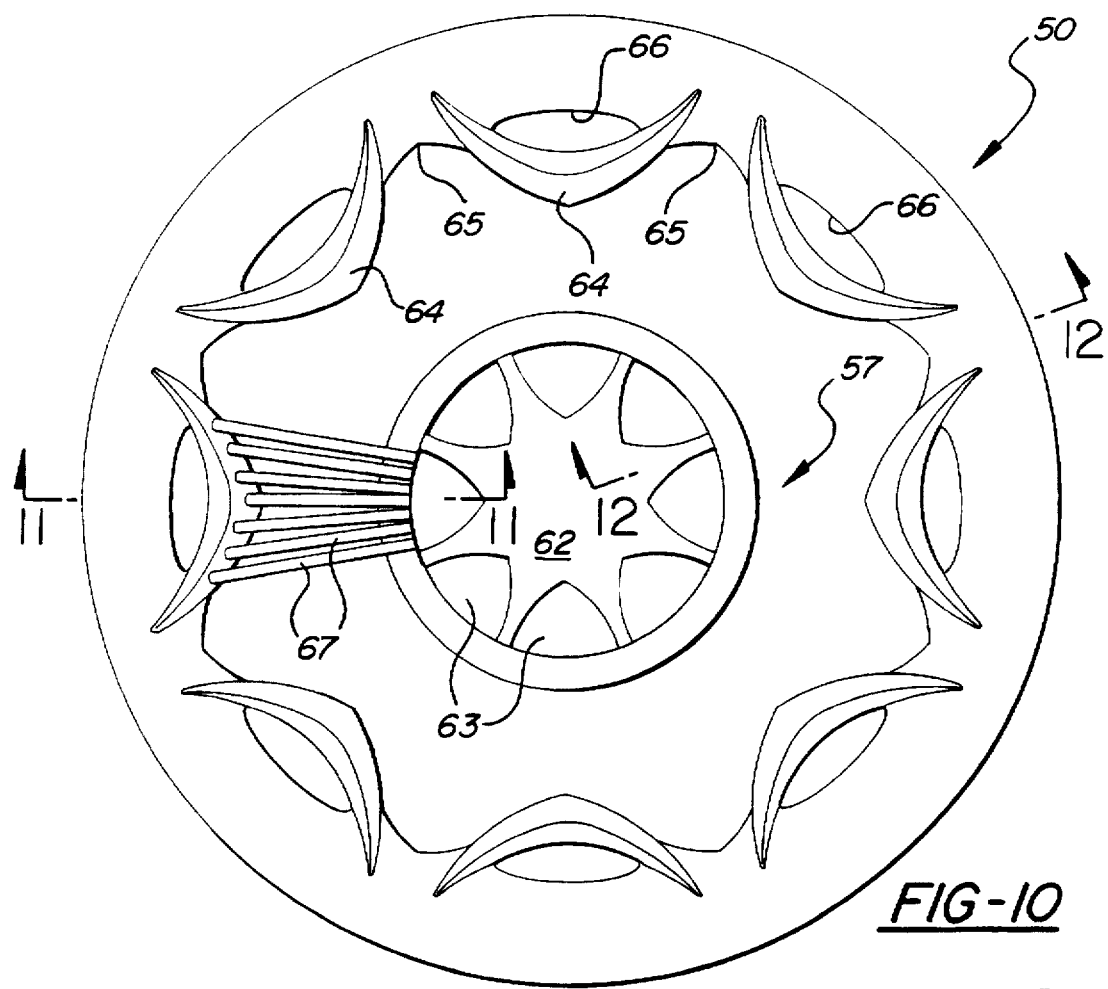
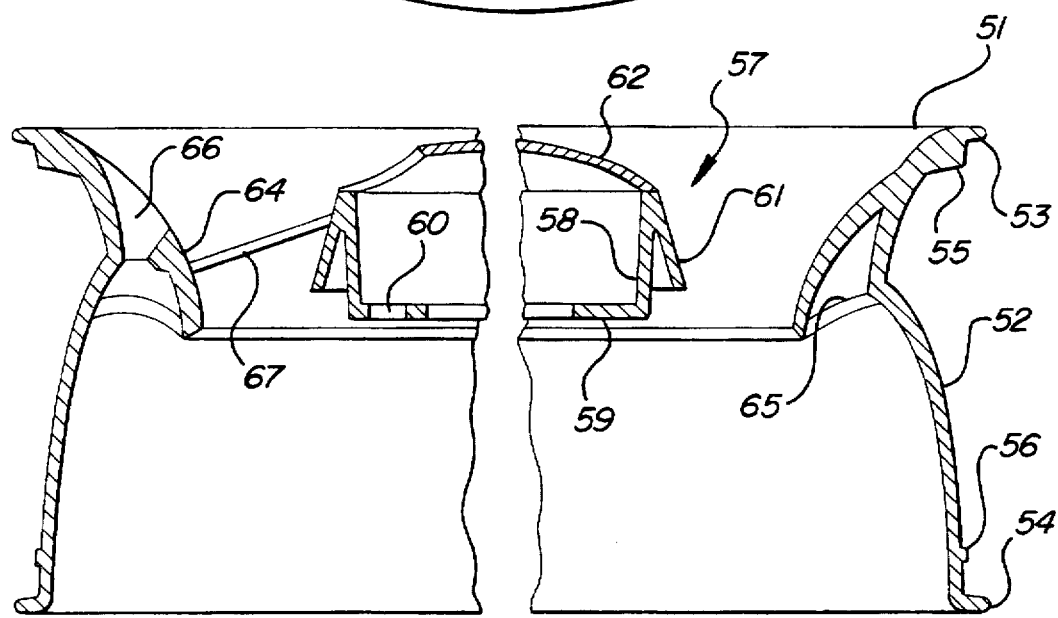

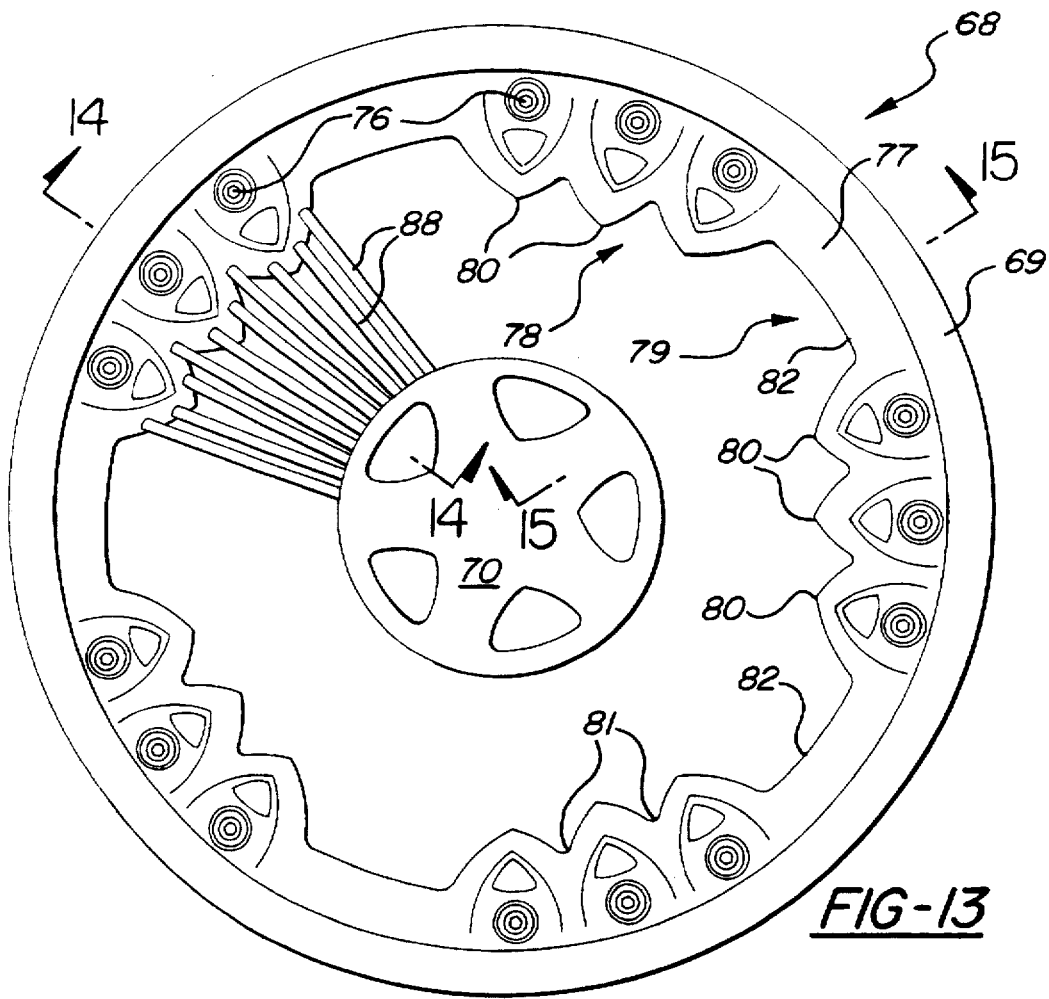
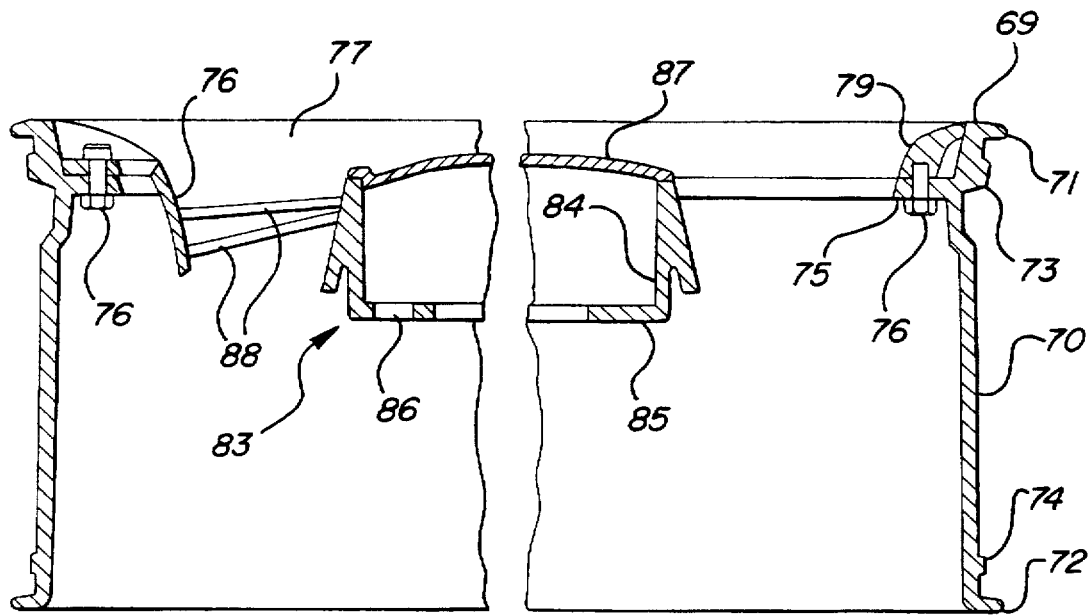
FIG-13
FIG-14
FIG-15

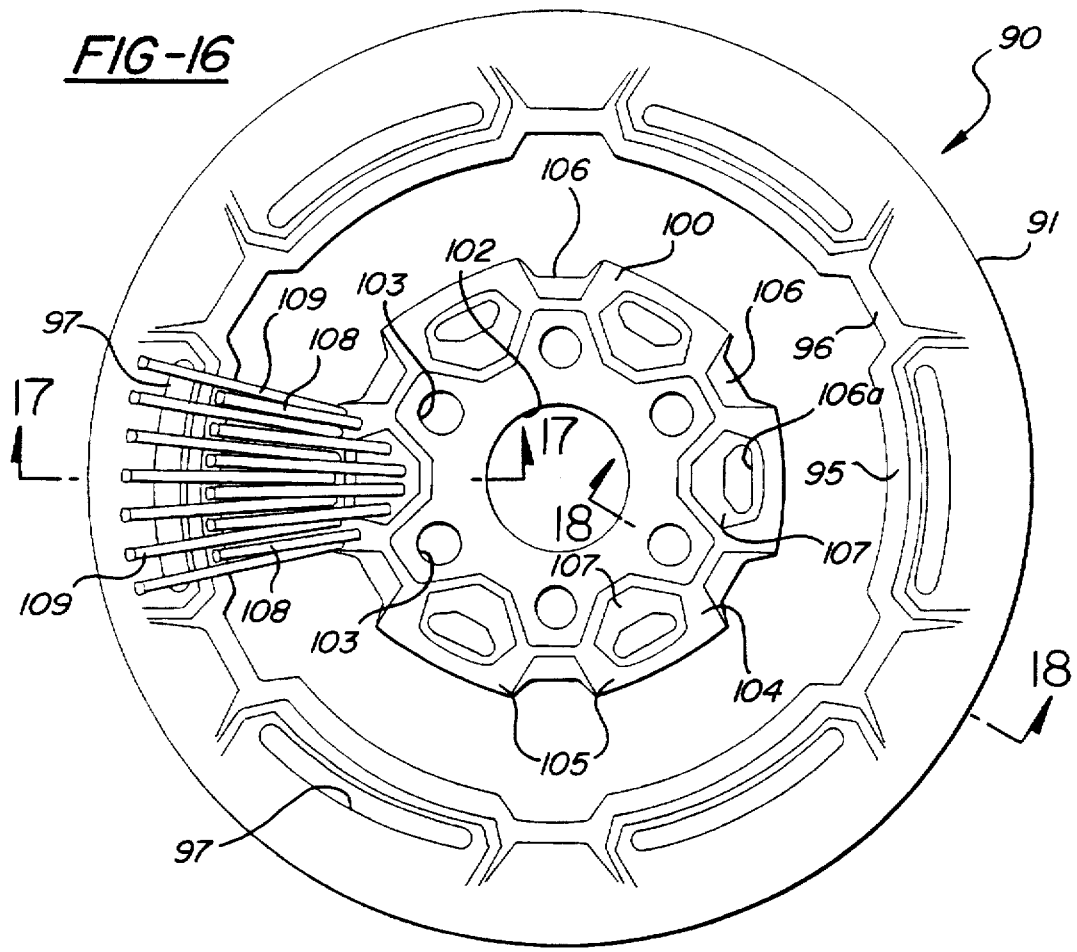

AUTOMOTIVE WIRE SPOKE WHEELS

This invention relates to automotive wheels and more particularly to such wheels that comprise an annular rim, a central hub, and wire spokes interconnecting the rim and hub.

BACKGROUND OF THE INVENTION

For many years it has been conventional to manufacture a wheel for installation on an automotive vehicle wherein the wheel is composed of an annular rim, a central hub, and circumferentially spaced radial spokes which join the rim and the hub. More recently it has been conventional to manufacture a wheel comprising an annular rim, a hub, and either an imperforate or pierced disk joining or coupling the rim and the hub. In some instances the disk is an integral part of the rim, or the hub, or both.

To some persons the conventional rim, hub, and spoke wheels are satisfactory and the same observation applies to the rim, hub, and disk wheels. Others, however, prefer a wheel having a more aesthetic appearance. To satisfy this preference it has been customary to provide a wheel cover having an outer annular flange, a central hub, and circumferentially spaced spoke-like members which span the flange and the hub. The flange of such a wheel cover is removably secured to the radially inner surface of the wheel's rim, thereby enabling the wheel to simulate the appearance of a wire spoke wheel.

There are many disadvantages to the use of wheel covers which simulate wire spoke wheels. One of these is that the covers themselves are expensive thereby requiring the user not only to purchase the wheels supplied by the vehicle manufacturer, but also to purchase the covers.

Another disadvantage is that a wheel cover necessarily must be removable from the wheel so as to enable it to be demounted for rotation, or replacement of the tires, or for any other reason. On some occasions the wheel cover is not replaced properly and, as a consequence, the cover may become detached from the wheel on which it is mounted, thereby resulting in loss of the cover.

Another disadvantage of simulated wire spoke wheel covers is that the wheel disk underlying the cover is visible, thereby detracting from the appearance for which the cover is purchased and installed.

A further disadvantage of wheel covers is that they sometimes cause imbalance of the wheels on which they are mounted, thereby resulting in vibration and undue tire wear.

Among the objects of the present invention is the provision of a wire spoke wheel which overcomes the disadvantages referred to above and which provides an aesthetically pleasing appearance.

SUMMARY OF THE INVENTION

A wire spoke wheel constructed in accordance with the invention comprises an annular rim having a hub at its axis of rotation. The rim has an axial width sufficient to provide support for a tubeless or tube tire. The distance between the hub and the rim is spanned by a plurality of wire spokes. The rim has a radially outer surface which is uniformly circular, whereas the radially inner surface of the rim can have any one of a number of selected configurations which enable the spokes to be arranged in any selected one of a plurality of patterns to produce a desired appearance.

The configuration of the inner surface of the wheel rim preferably is scalloped or otherwise shaped at circumferentially spaced intervals or zones so as to provide a wheel having a balanced design. The same observation applies to the configuration of the hub.

To facilitate the joining of spokes to the hub and to the wheel rim either the hub, the rim, or both may be provided with circumferential flanges to which corresponding ends of the spokes may be secured. The rim flange preferably is radially inward of the inner periphery of the rim, thereby avoiding the necessity of providing any spoke-accommodating openings in communication with the interior of a tire mounted on the rim. This construction thus ensures airtight integrity of the rim.

THE DRAWINGS

Several embodiments of the invention are illustrated in the accompanying drawings wherein:

FIG. 1 is a front elevational view of a wheel formed in accordance with one embodiment of the invention;

FIGS. 2 and 3 are sectional views taken on the lines 2—2 and 3—3, respectively, of FIG. 1;

FIG. 4 is an elevational view of another embodiment;

FIGS. 5 and 6 are sectional views taken on the lines 5—5 and 6—6, respectively, of FIG. 4;

FIG. 7 is a partial, elevational view of another embodiment;

FIGS. 8 and 9 are sectional views taken on the lines 8—8 and 9—9, respectively, of FIG. 7;

FIG. 10 is a partial, elevational view of another embodiment;

FIGS. 11 and 12 are sectional views taken on the lines 11—11 and 12—12, respectively, of FIG. 10;

FIG. 13 is a partial, elevational view of another embodiment;

FIGS. 14 and 15 are sectional views taken on the lines 14—14 and 15—15, respectively, of FIG. 13;

FIG. 16 is a partial, elevational view of another embodiment; and

FIGS. 17 and 18 are sectional views taken on the lines 17—17 and 18—18, respectively, of FIG. 16.

DETAILED DESCRIPTION OF THE PREFERRED EMBODIMENTS

Figure 1:
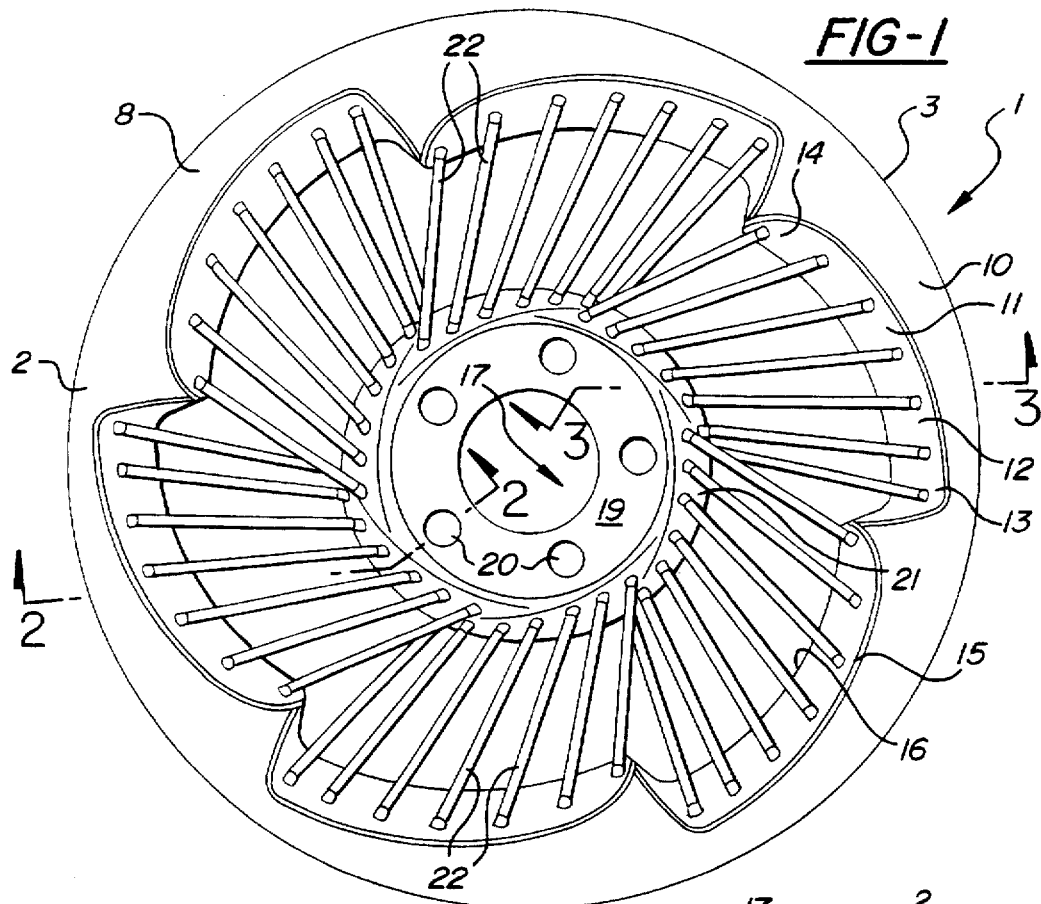
Figures 2, 3:
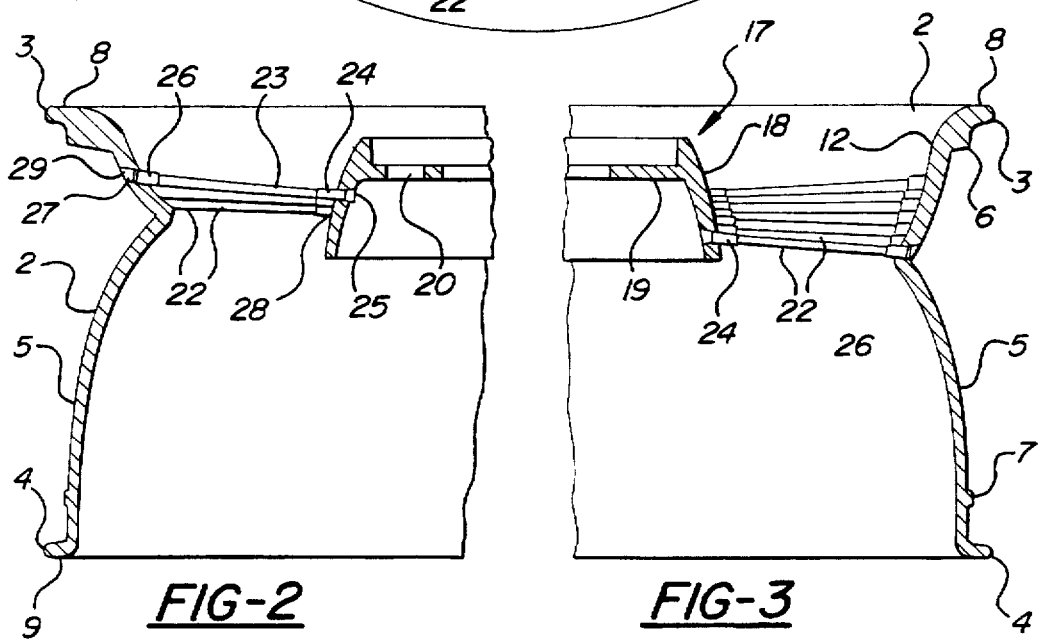

A wheel constructed in accordance with the embodiment shown in FIGS. 1—3 is designated generally by the reference character 1 and comprises an annular rim 2 having coplanar, radially outwardly projecting rim flanges 3 and 4 axially spaced apart by an annular web 5. The flanges 3 and 4 are spaced apart a distance sufficient to enable the radially inner edges of a tube type or tubeless tire to be accommodated therebetween. The web has outwardly projecting protrusions 6 and 7 which help to maintain the inner edges of the tire in proper position on the rim.

When the wheel 1 is fitted to a vehicle it has an external or outer side 8 which faces outwardly, or away from the vehicle, and an internal or inner side 9 which faces inwardly or toward the vehicle body. The outer side of the rim has a smooth or planar surface 10 adjacent the peripherally outer edge of the rim, whereas the inner periphery of the rim has a plurality of a circumferentially spaced contoured zones 11 each of which has a slightly concave surface 12 which extends smoothly and circumferentially from a radially outermost end 13 to a radially innermost end 14 along an arc of constantly changing radius. Each surface 12 is inclined in a direction inwardly and toward the center of the rim to provide radially outer and inner edges 15 and 16, respectively, for each surface 12. When the wheel is in the position shown in FIG. 1, both of the edges 15 and 16 are visible. As is shown clearly in FIG. 1, there are six zones 11, each of which corresponds to the others, and all of which are uniformly spaced circumferentially of the rim 2.

At the center of the wheel 1 is a hub 17. The hub can be annular or composed of circumferentially spaced contoured surfaces. As shown, the hub has an outwardly bowed side wall 18 and a recessed flange 19 provided with openings 20 through which lug bolts (not shown) may pass. The wall 18 has a number of circumferentially spaced surfaces 21 corresponding in number to the number of zones 11. The outer surface of each of the sections 21 corresponds substantially to the curvature of each of the zone surfaces 12.

Spanning the rim 2 and the hub 17 is a plurality of wire spokes 22. Except for length each spoke structurally is the same and has a shank 23 one end of which is fixed in a socket 24 having an enlarged head 25. The opposite end of each shank 23 is threadedly accommodated in a threaded socket 26 which terminates at its free end in an enlarged head 27. Each socket 24 extends through an opening 28 in the wall 18 of the hub 17. Each socket 26 extends through an opening 29 in a web 5 of the rim 1. In each instance, the openings 28 and 29 are tapered so as to preclude passage of the enlarged ends of the respective enlarged ends 25 and 27 of the respective sockets through the openings.

To assemble the parts with one another, the sockets 26 are removed from the spoke shanks 23 and the latter extended through the openings 28 in the hub 17 toward the rim 2. Each socket 26 is extended through the associated opening 29 so as to receive the threaded end of the shank. The shank and the socket then may be rotated relative to one another to cause the enlarged ends 25 and 27 of the sockets to fit tightly within the respective openings and thereby couple the hub and the rim to one another.

Although the openings 29 in which the sockets 26 are accommodated lie between the axially opposite flanges 3 and 4 of the rim 2, the enlarged heads 27 seat on the sides of the tapered openings 29 and provide a seal for each opening 29, thereby precluding the escape of air from a tubeless tire through the openings 29. If desired, each of the openings 29 may be provided with a suitable sealant following assembly of the rim, the hub, and the spokes.

The spokes 22 do not extend radially of the rim or the hub. Instead, their inner ends are tangent to a circle having its center at the center of the rim. Further, the inner ends of the spokes at the opposite ends of the hub sections 21 overlie one another, and both the inner and outer ends of the spokes are offset from one another axially of the wheel as clearly is shown in FIGS. 1-3. This offset enables the forces transmitted between the rim and the hub by the spokes to be distributed over a greater axial area of the wheel than otherwise would be the case.

Figure 4:
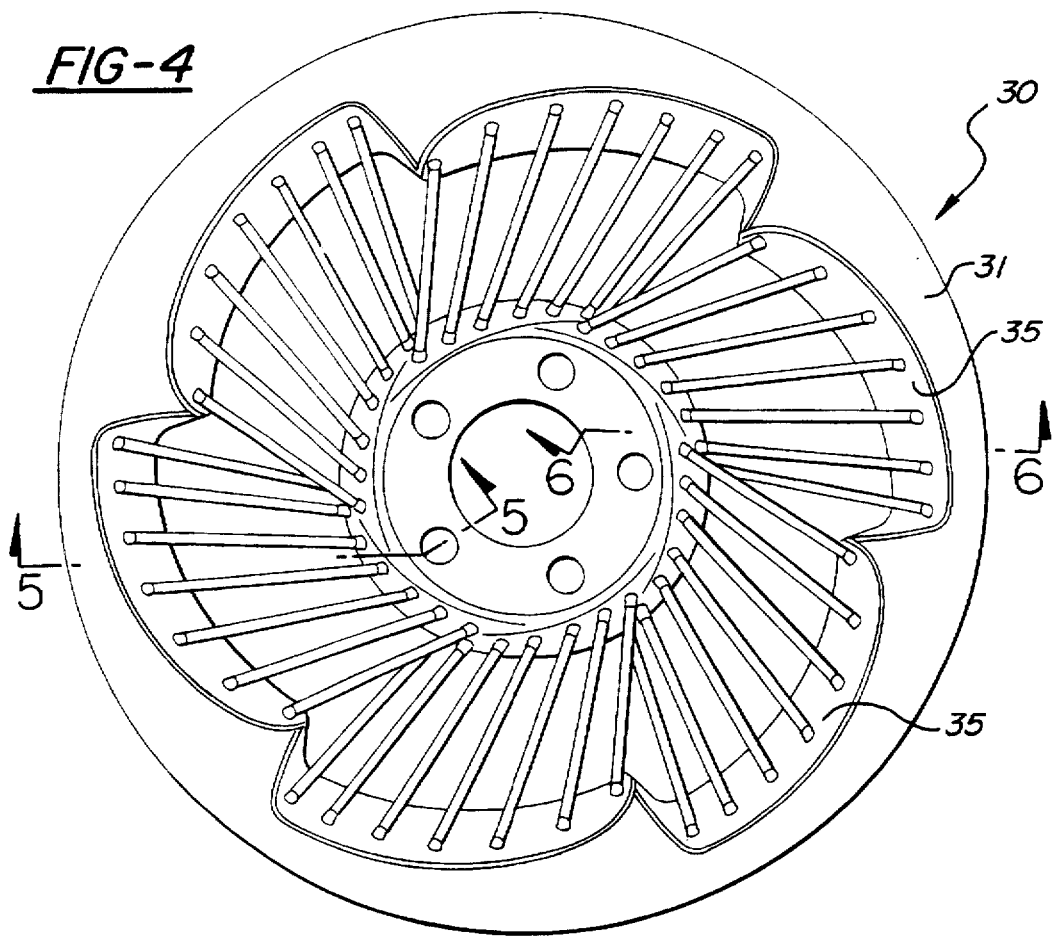
Figures 5, 6:
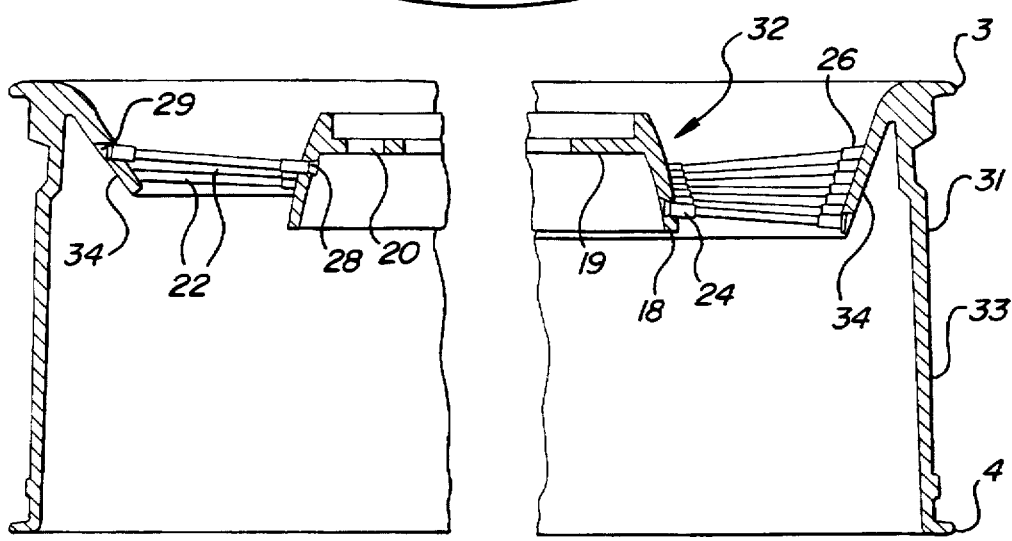

The embodiment of the invention disclosed in FIGS. 4-6 corresponds in many respects to that shown in FIGS. 1-3. However, there are certain differences. Some of the parts of the embodiment shown in FIGS. 4-6 which correspond to similar parts in the earlier described embodiment are identified by the same reference characters.

The wheel shown in FIGS. 4-6 is designated generally by the reference character 30 and comprises a rim 31 the outer surface of which corresponds exactly to that of FIG. 1. The wheel 30 also includes a hub 32 which corresponds exactly to the hub 17. The wheel 30 also includes spokes 22 which correspond exactly to the spokes 22.

The rim 31 differs from the rim 2 in that the rim 31 has a web 33 which is substantially cylindrical between its flanges 3 and 4. The rim 31 also differs from the rim 2 by the provision of an annular flange 34 which extends inwardly of the web 33 and is inclined toward the axis of rotation of the rim. The flange 34 is configured in such manner as to provide contoured zones 35 which correspond exactly to the surfaces 12 and which are uniformly spaced circumferentially about the rim.

The spokes 22 of the wheel 30 span the hub 32 and the flange 34, and each spoke has a corresponding socket 24 adjacent the hub 32 and a corresponding socket 26 adjacent the flange 34. Each of the sockets extends through openings in the hub flange 18 and in the rim flange 34 which correspond to the openings 28 and 29 of the earlier described embodiment.

In the embodiment of FIGS. 4-6, no part of any spoke 22 or socket 26 extends through the rim web 33, thereby precluding any possibility of leakage of air from a tire through the openings which otherwise would be required to accomodate the sockets 26.

The wheel 36 shown in FIGS. 7-9 includes a rim 37 corresponding substantially to the rim 31 shown in FIGS. 4-6. The rim 37 has the axially spaced flanges 3 and 4 spanned by the web 33 and a flange 38 corresponding substantially to the flange 34. The wheel 36 also has a hub 39 of cup-like configuration comprising an annular side wall 40 and a base 41 provided with a central opening 40a and circumferentially spaced openings 43 for the accommodation of lug bolts. In this embodiment the hub has a cover 44 which is frictionally or threadedly coupled to the side wall 40. A suitable cover can be provided for any of the other embodiments herein described.

A plurality of spokes 45 corresponding in all structural respects to the spokes 22 span the rim flange 38 and the hub wall 40. It will be understood that there are sufficient spokes to extend about the entire circumference of the wheel and in the pattern shown in FIG. 7. For convenience, however, only some of the spokes are shown, and this observation applies equally to the embodiments subsequently described.

In the embodiment of FIGS. 7-9 the flange 38 has a plurality of radially outwardly extending, indented or concave contoured zones 46 which are uniformly spaced circumferentially of the flange 38. Sandwiched between each adjacent pair of zones 46 is a zone 47 having an axially concave surface 48. Each of the zones 46 has a convex surface 49.

The spokes 45 which extend to the zones 47 are joined to the wall 40 of the hub 39 adjacent the radially outer edge thereof, whereas the spokes 45 which extend to the zones 46 are joined to the hub wall 40 adjacent the radially inner end of the latter. This arrangement provides some overlap or interleaving between the adjacent ones of the groups of spokes as is shown in FIG. 7. Such arrangement also enables forces exerted by the spokes on the rim and the hub to be distributed over a greater axial area of both the hub and the rim.

The wheel 50 shown in FIGS. 10-12 has an annular rim 51 corresponding in cross section to the rim 2 in that the rim 51 has a web 52 terminating at its opposite ends in rim flanges 53 and 54. The web 52 also includes tire-positioning protrusions 55 and 56 like the corresponding parts 6 and 7.

The wheel 50 also includes a hub 57 having a side wall 58 and a base 59 provided with openings 60 for the accommodation of lug bolts. The hub 57 has a peripheral flange 61 which extends from the outer edge of the hub and flares axially. The hub also includes a cover 62 having a plurality of spaced openings 63 about its periphery. The cover may be threaded or otherwise secured to the wall 58.

At uniformly spaced intervals about the circumference of the rim 51 is a plurality of alternately radially convex and concave zones 64 and 65, respectively. The surface of each convex zone overlies an opening 66. A plurality of spokes 67 (not all of which are shown in FIGS. 10–12) corresponding in all structural respects to the spokes described earlier span the distance from the hub 57 to the rim 51 and are secured thereto in the same manner. Due to the convexity of the surfaces of the zones 64, not all of the spokes 67 will be of the same length, as clearly is shown in FIG. 10. Neither will all of the spokes lie in the same plane. Instead, they are axially offset and occupy different planes, thereby enabling the stress imposed by the spokes on the hub and rim to be distributed over a substantial portion of the areas of the hub and rim.

FIGS. 13–15 illustrate a wheel 68 having a rim 69 including an axially extending web 70 terminating at its opposite ends in rim flanges 71 and 72 adjacent tire retaining ribs 73 and 74.

The rim 69 has a radially inwardly projecting flange 75 adjacent the outer edge of the rim and such flange is uninterrupted throughout the circumference of the rim. Removably secured to the flange 75 by bolts 76 is an annulus 77 having alternating sets of radially convex and radially concave contoured zones 78 and 79, respectively. Each zone 78 has three convex surfaces 80 spaced by concave valleys 81. Each concave zone 79 has a smoothly curved surface 82 concentric with the rim 69.

The wheel 68 also has a hub 83 having a side wall 84, a base 85, and openings 86 in the base for the accommodation of lug bolts. A cover 87 also may be secured to the outer edge of the hub 83 in any suitable manner.

Joining the hub 83 and the annulus 77 is a plurality of spokes 88 (not all of which are shown) corresponding in all structural respects to the spokes 22 described earlier. In this embodiment the radially outer ends of the spokes are secured to the rim at the convex zones 78 only. Accordingly, the radially outer ends of the spokes 88 are spaced axially of the surfaces 80, as shown in FIG. 14, thereby distributing the stress imposed on the annulus by the spokes over a greater area.

The separability of the annulus 77 from the rim flange 75 enables the hub, the spokes, and the annulus to be preassembled prior to assembly with the rim 69, as well as to be removed as a unit from the rim in the event any of the spokes require replacing.

The wheel 90 shown in FIGS. 16–18 comprises a contoured annular rim 91 having an axially extending web 92 terminating at its opposite ends in rim flanges 93 and 94. Adjacent the bead 93 the web is indented to provide circumferentially spaced, radially convex zones 95 spaced from one another by radially concave zones 96. Each of the zones 95 has an arcuate opening 97 which divides the zone into radially inner and radially outer parts 98 and 99, respectively.

Concentric with the rim 91 is a hub 100 having an outer wall 101 provided with a central opening 102 and circumferentially spaced lug bolt openings 103. The hub has a peripheral wall 104 provided with a plurality of circumferentially spaced, radially projecting surfaces 105 spaced from one another by radially indented surfaces 106. Each of the surfaces 105 is provided with an opening 106a encircled by radially inwardly extending surfaces 107. The surfaces 105 and 106 of the hub confront the surfaces 95 and 96, respectively, of the rim.

A plurality of spokes join the hub and the rim. The spokes are of two kinds, one of which is designated 108 and the other 109. Each spoke 108 spans the surfaces 99 and 106 of the rim and the hub, respectively, and each spoke 109 spans the web 92 of the rim and the surface 105 of the hub. At opposite ends of each spoke 108 are sockets 110 and 111, respectively, and at opposite ends of each spoke 109 are sockets 112 and 113, respectively. The geometry of the confronting surfaces of the rim and hub require that some of the spokes be bent adjacent the radially inner ends of the sockets, as is shown clearly in FIG. 17.

There is one set of spokes 108 associated with each of the confronting rim and hub surfaces 99 and 105, and another set of spokes 109 associated with each of the same confronting surfaces, as is shown in FIGS. 16 and 17. The radially outer ends of the spokes 108 lie axially inward of the radially outer ends of the spokes 109, whereas the radially inner ends of the spokes 108 lie axially outward of the corresponding ends of the spokes 109. This arrangement enables axial distribution of the forces exerted by the spokes on the rim and the hub. The arrangement also causes the spokes of each set to present at interleaved configuration as is best shown in FIG. 17.

It will be apparent that in some embodiments all of the spokes extend substantially radially of the hub and rim members, whereas in others only some of the spokes are radial. In other embodiments none of the spokes is radial, but all of the spokes are offset and in the same circumferential direction relative to the center of the hub. In at least one embodiment adjacent spokes are interleaved. Preferably, the junctions of the spokes with the respective rim and hub members are axially offset, thereby providing a greater area over which stresses may be distributed. The different spoke arrangements also enable unique and aesthetic designs to be created.

The disclosed embodiments are representative of presently preferred forms of the invention, but are intended to be illustrative rather than definitive thereof. The invention is defined in the claims.

I claim:

1. A wheel comprising an annular rim member having a center and a web of such axial width as to support an inflatable tire, said web having axially inner and outer peripheral edges each of which is of uniform, constant radius; a hub member at the center of said rim member and having a radially outer peripheral wall spaced from and confronting said rim member, said rim member having adjacent said outer peripheral edge and radially inward thereof an annular wall portion inclined axially and radially inwardly of said outer peripheral edge, said wall portion having a plurality of circumferentially spaced zones each of which has a corresponding surface confronting said hub member, each said corresponding surface having each portion thereof located at a different radial distance from the center of said annular rim member; and a plurality of spokes, corresponding ends of which are secured to said hub member and opposite corresponding ends of which are secured to said rim member at said zones, the lengths of the respective spokes being so selected that each of said spokes spans said members and maintains said members concentric.

2. The wheel according to claim 1 wherein said web has a rim flange at each of its peripheral edges and wherein between said rim flanges and adjacent said outer peripheral edge said web is deformed to provide said wall portions.

3. The wheel according to claim 1 wherein said wall portions comprises an annulus adjacent said one of said peripheral edges which extends radially inward of said rim, said zones being formed in said annulus.

4. The wheel according to claim 3 wherein said annulus and said rim member are unitary and integral with one another.

5. The wheel according to claim 3 wherein said annulus is separate from said rim member and including means for separably securing said annulus to said rim member.

6. The wheel according to claim 3 wherein said opposite corresponding ends of said spokes extend through said annulus and terminate short of said web.

7. The wheel according to claim 1 wherein said opposite corresponding ends of said spokes extend through said web of said rim member between said rim flanges.

8. The wheel according to claim 1 wherein said wall of said hub member is convexly bowed.

9. The wheel according to claim 1 wherein said wall of said hub member has a configuration complementary to that of said wall portion.

10. The wheel according to claim 9 wherein said wall of said hub member has a flange which projects axially in a direction away from said one of said peripheral edges of said rim member.

11. The wheel according to claim 1 wherein all of said spokes extend substantially radially of said members.

12. The wheel according to claim 1 wherein some of said spokes extend radially of said members.

13. The wheel according to claim 1 wherein some of said spokes extend substantially radially of said members and others of said spokes extend non-radially of said members.

14. The wheel according to claim 1 wherein none of said spokes extends radially of said members and wherein each of said spokes has its inner end circunferentially offset from the center of said members.

15. The wheel according to claim 1 wherein the corresponding ends of adjacent ones of said spokes are spaced axially of said hub member and the corresponding ends of adjacent ones of said spokes are spaced axially of said rim member.

16. The wheel according to claim 1 wherein some of said spokes extend radially of said members and wherein each of said spokes has its inner end secured to said hub member at a point tangent to a circle having its center coincident with the center of said hub member.

17. The wheel according to claim 14 wherein the inner end of each of said spokes is offset in the same circumferential direction from said center.

18. The wheel according to claim 17 wherein adjacent ones of said spokes are interleaved.

19. The wheel according to claim 1 wherein said surface of each of said zones is inclined axially of said rim, and wherein said opposite end of each of said spokes at each of said zones is axially offset relative to the opposite ends of all others of said spokes at each of said zones.

20. The wheel according to claim 19 wherein those of said spokes associated with each of said zones have their corresponding ends offset axially of said hub member.

21. The wheel according to claim 1 wherein all of said spokes have their said corresponding ends tangent to a circle having its center at the center of said rim, all of said spokes being inclined in the same direction.

22. A wheel comprising an annular rim member having a center and axially spaced peripheral edges joined by a web; an annular hub member having a diameter less than that of said rim member, a center coincident with the center of said rim member, and being positioned closer to one edge of said web than to the opposite edge thereof, said rim member having adjacent said one edge of said web and radially inward thereof an annular wall portion inclined axially and radially inward and a plurality of uniform sets of zones having alternating concave and convex surfaces, said sets of zones being uniformly spaced circumferentially of said rim member; and a plurality of sets of spokes spanning said hub member and said rim member, corresponding radially outer ends of each of said sets of spokes being secured to said rim member at selected ones of said sets of zones.

23. The wheel according to claim 22 wherein the concave surface of each of said sets of zones is radially concave.

24. The wheel according to claim 22 wherein the radial distance from any selected point on the surface of each of said sets of zones to the center of said rim is different.

25. The wheel according to claim 22 wherein the scalloped surface of each of said sets of zones has a portion thereof which is radially concave and an adjacent portion which is radially convex.

26. The wheel according to claim 22 wherein each of said spokes extends substantially radially of said rim.

27. The wheel according to claim 22 wherein each of said spokes extends from said hub to said rim along a line which is not a radial of said rim.

28. The wheel according the claim 22 wherein at least one of said members has a circumferential flange to which one end of each of said spokes is secured.

29. The wheel according to claim 28 wherein said flange is on said rim member.

30. The wheel according to claim 28 wherein said flange is on said hub member and forms said annular wall portion.

31. The wheel according to claim 28 wherein said flange constitutes an integral, unitary part of said rim member.

32. The wheel according to claim 28 wherein said flange is separate from said rim member and including means for securing said flange to said rim member.

33. The wheel according to claim 22 wherein each of said spokes has a radially inner end secured to said hub member, the radially inner end of alternate ones of said spokes being secured to said hub member at axially spaced positions.

* * * * *